(12) United States Patent
Stahl

(10) Patent No.: US 11,725,782 B2
(45) Date of Patent: Aug. 15, 2023

(54) MOTOR VEHICLE HAVING AN OPENING FOR PRESSURE RELIEF

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 467 days.

(21) Appl. No.: 16/651,490

(22) PCT Filed: Aug. 27, 2018

(86) PCT No.: PCT/EP2018/073024
§ 371 (c)(1),
(2) Date: Mar. 27, 2020

(87) PCT Pub. No.: WO2019/063223
PCT Pub. Date: Apr. 4, 2019

(65) Prior Publication Data
US 2020/0263835 A1    Aug. 20, 2020

(30) Foreign Application Priority Data

Sep. 28, 2017   (DE) .................... 10 2017 217 341.6
Sep. 28, 2017   (DE) .................... 10 2017 217 343.2

(51) Int. Cl.
*B60K 15/035*    (2006.01)
*F17C 13/12*     (2006.01)
(Continued)

(52) U.S. Cl.
CPC .......... *F17C 13/123* (2013.01); *B60K 15/035* (2013.01); *B60K 15/067* (2013.01);
(Continued)

(58) Field of Classification Search
CPC ........ B60K 15/067; B60K 2015/03523; B60K 2015/0358; B60K 2015/0515;
(Continued)

(56) References Cited

U.S. PATENT DOCUMENTS 4,431,716 A * 2/1984 Eppley ............. H01M 50/3425
220/202
5,161,738 A * 11/1992 Wass .................... G05D 23/026
137/72

(Continued)

FOREIGN PATENT DOCUMENTS

CN       105150983 A    12/2015
CN       106574747 A     4/2017
(Continued)

OTHER PUBLICATIONS

Machine translation of DE102013019821, Daimler AG, May 2015, all pages (Year: 2015).*

(Continued)

*Primary Examiner* — Nicolas A Arnett
(74) *Attorney, Agent, or Firm* — Crowell & Moring LLP

(57) ABSTRACT

A motor vehicle has at least one pressure vessel for storing storage medium, preferably fuel, at least one pressure relief device for pressure relief of the at least one pressure vessel, and at least one opening through which storage medium flows out during a pressure relief.

12 Claims, 1 Drawing Sheet

(51) Int. Cl.
*B60K 15/05* (2006.01)
*B60K 15/063* (2006.01)
*B60K 15/067* (2006.01)

(52) U.S. Cl.
CPC ............ *B60K 2015/0358* (2013.01); *B60K 2015/03523* (2013.01); *B60K 2015/053* (2013.01); *B60K 2015/0515* (2013.01); *B60K 2015/0631* (2013.01); *F17C 2205/0332* (2013.01); *F17C 2221/012* (2013.01); *F17C 2221/033* (2013.01); *F17C 2223/036* (2013.01); *F17C 2260/021* (2013.01); *F17C 2270/0178* (2013.01)

(58) Field of Classification Search
CPC ...... B60K 2015/053; B60K 2015/0631; F17C 13/123; F17C 2205/0332; F17C 2221/012; F17C 2221/033; F17C 2223/036; F17C 2223/0123; F17C 2223/0153; F17C 2260/021; F17C 2260/042; F17C 2270/0178; F17C 2270/0168; Y02E 60/32
See application file for complete search history.

(56) References Cited

U.S. PATENT DOCUMENTS

| | | | | |
|---|---|---|---|---|
| 5,452,738 | A * | 9/1995 | Borland | F16K 31/0655 137/613 |
| 6,006,774 | A * | 12/1999 | Lhymn | F16K 17/383 137/72 |
| 6,814,097 | B2 * | 11/2004 | Girouard | F16K 17/383 137/72 |
| 8,733,382 | B2 * | 5/2014 | Suess | F16K 17/383 220/580 |
| 2002/0092562 | A1 * | 7/2002 | Kami | B60K 15/03006 137/312 |
| 2014/0097260 | A1 * | 4/2014 | Veenstra | B60K 15/07 29/428 |
| 2014/0220469 | A1 * | 8/2014 | Heise | H01M 8/04201 137/72 |
| 2017/0144535 | A1 * | 5/2017 | Sonderegger | F17C 13/12 |
| 2020/0109791 | A1 * | 4/2020 | Hettenkofer | F16K 17/30 |
| 2020/0385068 | A1 * | 12/2020 | Szoucsek | B62D 25/10 |

FOREIGN PATENT DOCUMENTS

| | | | |
|---|---|---|---|
| DE | 43 39 431 C1 | 6/1995 | |
| DE | 10 2005 054 967 A1 | 5/2007 | |
| DE | 10 2011 114 725 A1 | 4/2013 | |
| DE | 10 2013 016 036 A1 | 3/2015 | |
| DE | 10 2013 019 821 A1 | 5/2015 | |
| DE | 10 2013 223 259 A1 | 5/2015 | |
| DE | 20 2014 001 822 U1 | 7/2015 | |
| DE | 10 2014 006 026 A1 | 10/2015 | |
| DE | 10 2014 017 988 A1 | 6/2016 | |
| DE | 10 2016 007 936 A1 | 2/2017 | |
| DE | 10 2015 011 841 A1 | 3/2017 | |
| DE | 102015012034 A1 * | 3/2017 | ............ F17C 13/04 |
| DE | 102016222668 A1 * | 5/2018 | ............ F17C 13/02 |
| EP | 1 655 533 B1 | 1/2008 | |

OTHER PUBLICATIONS

Chinese-language Office Action issued in Chinese Application No. 201880062960.7 dated Mar. 15, 2021 with English translation (15 pages).
International Search Report (PCT/ISA/210) issued in PCT Application No. PCT/EP2018/073024 dated Nov. 23, 2018 with English translation (four (4) pages).
German-language Written Opinion (PCT/ISA/237) issued in PCT Application No. PCT/EP2018/073024 dated Nov. 23, 2018 (six (6) pages).
German-language Search Report issued in German Application No. 10 2017217 341.6 dated Aug. 16, 2018 with partial English translation (16 pages).

* cited by examiner

MOTOR VEHICLE HAVING AN OPENING FOR PRESSURE RELIEF

BACKGROUND AND SUMMARY OF THE INVENTION

The technology disclosed here relates to a motor vehicle having at least one pressure vessel for storing storage medium, in particular fuel. Such a vehicle can be a fuel cell vehicle, for example. Fuel cell vehicles as such are known. The pressure vessels also generally comprise thermally activatable pressure relief devices (also termed TPRD systems or thermal fuses) which, in the case of a thermal event on the pressure vessel, allow the storage medium to escape into the surroundings. There exists a desire not to allow the fuel to flow out into closed spaces of the motor vehicle but into the surroundings. This is particularly then the case if the storage medium is a highly flammable medium.

It is a preferred object of the technology disclosed here to reduce or overcome at least one disadvantage of a previously known solution or to propose an alternative solution. It is particularly a preferred object of the technology disclosed here to provide a motor vehicle whose pressure vessel(s) can be relieved of pressure in a simple and secure manner, with the pressure relief device(s) necessary for this purpose preferably not having, or only slightly having, a disadvantageous effect on installation space, costs, driving comfort and/or driving performance. Further preferred objects can result from the advantageous effects of the technology disclosed here. The object(s) is/are achieved by the subject matter of the claimed invention.

The technology disclosed here relates to a motor vehicle. The motor vehicle comprises at least one pressure vessel for storing storage medium, in particular fuel; at least one pressure relief device for pressure relief of at least one pressure vessel; and at least one opening which opens adjacent to a body outer skin and preferably to an underfloor cladding.

The motor vehicle can be, for example, a passenger car, a motor cycle or a commercial vehicle.

The pressure vessel preferably serves for storing fuel which is gaseous under ambient conditions. The at least one pressure vessel can be used for example in a motor vehicle which is operated with compressed natural gas (=CNG) or liquefied natural gas (LNG) or with hydrogen.

The at least one pressure vessel can be for example a composite overwrapped pressure vessel (=COPV). The pressure vessel can be for example a cryogenic pressure vessel (=CcH2 or COP) or a high-pressure gas vessel (=CGH2).

High-pressure gas vessels are designed, at ambient temperatures, to store fuel permanently at a nominal operating pressure (also termed nominal working pressure or NWP) of about 350 bar gauge (=overpressure with respect to atmospheric pressure), further preferably of about 700 bar gauge or more. A cryogenic pressure vessel is suitable for storing the fuel at the aforementioned operating pressures even at temperatures which are considerably below the operating temperature of the motor vehicle.

The opening is fluidically connected to the pressure relief device, for example via at least one pressure relief line which concomitantly forms the pressure relief path.

Pressure relief is the process by means of which the pressure in the pressure vessel is reduced as a result of an event. The event is in particular not the intended removal for supplying an energy converter, but in particular a disturbance case. The pressure relief generally begins with the at least partial opening of a valve and/or a rupture element which is directly fluidically connected to the pressure vessel.

The pressure relief can preferably occur by means of at least one pressure relief device. If a disturbance case occurs on account of a malfunction of another component and/or as a result of an external thermal and/or mechanical action (for example accident, local flame, etc.), the pressure relief device is designed to reduce the pressure in the pressure vessel system, in particular in the at least one pressure vessel. The pressure relief device is fluidically connected to the at least one pressure vessel. The pressure relief device can expediently be designed, for the pressure relief of the pressure vessel, to allow a fuel removal mass flow which is greater (for example at least by the factor 1.5; 2; 5; 10; 100 or more) than the maximum fuel removal mass flow through the removal path to the at least one energy converter (as a rule through a tank shut-off valve). The at least one pressure relief device is generally not used for filling the pressure vessel system and/or for removing fuel to provide energy in the motor vehicle during operation without a disturbance case. For pressure relief, use can expediently be made of a flow path parallel to the anode subsystem. The pressure vessel inner pressure is generally lowered to atmospheric pressure by the pressure relief. However, the pressure relief device can also be designed, in the disturbance case, to reduce the pressure vessel inner pressure to a disturbance case pressure vessel inner pressure which is as a rule low enough that no rupture event occurs even in the case of a damaged pressure vessel wall (for example fiber-reinforced layer destroyed at least in certain regions). A pressure relief device can be for example an overpressure valve or a rupture disk or a thermally activatable pressure relief device.

The pressure relief device can be a thermally activatable pressure relief device. The thermally activatable pressure relief device, also termed thermal pressure release device or TPRD, is generally provided adjacent to the pressure vessel. Under the action of heat (for example as a result of flames), the fuel stored in the pressure vessel is discharged into the surroundings by the TPRD. The pressure relief device discharges the fuel as soon as the triggering temperature of the TPRD is exceeded (=is thermally activated). Triggering lines can also be provided. Such a system for thermal pressure relief is shown for example in DE 10 2011114725 A1 or in EP 1 655 533 B1. In the event of fire, such thermally activatable pressure relief devices thus bring about a pressure relief and release the storage medium in a controlled manner before the pressure bearing capability of the pressure vessel walls has been reduced by the effect of fire to such an extent that it falls below the current pressure vessel inner pressure and rupture occurs.

However, the pressure relief device can also be configured in another way, for example as a rupture disk or a correspondingly actuated valve.

The body outer skin of the motor vehicle here comprises all body parts which delimit the motor vehicle toward the external surroundings, in particular thus the outer surfaces of the motor vehicle which concomitantly influence the air resistance coefficient of the motor vehicle. In addition to the skins/claddings on the sides, on the roof and/or underfloor, the body outer skin also comprises the wheelhouses, for example. Not belonging to the body outer skin, however, are for example body parts which are concealed by further vehicle parts (for example panels) and thus are not visible from outside and are irrelevant for the air resistance coefficient (for example the inner side of the B-pillar).

The underfloor cladding forms the body outer skin on the underside of the motor vehicle. Ambient air thus flows around the underfloor cladding during travel and said cladding can thus directly influence the air resistance of the motor vehicle during travel. Such an underfloor cladding is accordingly designed in a flow-optimized manner. The underfloor cladding can also serve to protect components situated above. The protective function can refer for example to weather influences, heat, cold, moisture, spray water, saltwater, chip spray, snow spray and/or slush spray and/or fire. The underfloor cladding is in particular designed, before a pressure relief, to at least partially and preferably completely cover the at least one opening and further vehicle components (for example pressure vessels, electric cables, any crossmembers and/or longitudinal members, the axle suspension, the vehicle structure, etc.). The underfloor cladding forms the vehicle outer skin in these regions which cover the opening and further vehicle components. The underfloor cladding preferably covers an area of the vehicle underfloor which is greater at least by the factor 20; or
at least by the factor 50; or
at least by the factor 100,
than the cross-sectional area of the opening of the at least one pressure relief line.

The term "adjacent to" the body outer skin or underfloor cladding means in this connection that the opening bears against the underfloor cladding or else is designed to be slightly spaced-apart such that a gap is formed between the underfloor cladding and opening.

The opening is preferably formed set back with respect to the body outer skin or the underfloor cladding, in particular set back with respect to the outlet opening disclosed here of the body outer skin or underfloor cladding. The opening O can preferably be arranged at a distance of 0.1 cm to 20 cm; or
0.5 cm to 10 cm; or
1 cm to 5 cm,
from the body outer skin or underfloor cladding.

In one embodiment, the underfloor cladding is designed to be changed by the outflowing storage medium in its shape and/or arrangement in the motor vehicle in such a way that the underfloor cladding directly or indirectly improves the outflow of storage medium, in particular by the flow resistance for the storage medium from the flow path into the motor vehicle surroundings being reduced. For example, the underfloor cladding can be designed in such a way and fitted to the motor vehicle in such a way that:

the motor vehicle has a better air resistance coefficient in a first position of the underfloor cladding than in a second position of the underfloor cladding, and the storage medium can flow out better through the opening into the surroundings in the second position of the underfloor cladding than in the first position. In particular, the underfloor cladding can be designed and fitted to the motor vehicle in such a way that the underfloor cladding is fastened to the motor vehicle in the first position before a pressure relief; and assumes the second position at the start and/or during a pressure relief.

In other words, in one embodiment of the technology disclosed here, the underfloor cladding disclosed here represents the closure disclosed here of the opening.

In particular, the motor vehicle can comprise at least one fastener, wherein the at least one fastener is designed to be released if the pressure relief occurs, in particular at the start of and/or during the pressure relief. The fastener can advantageously be configured in such a way that the release of the fastener is brought about directly or indirectly by the outflowing storage medium. The fastener can be released for example as a result of the fact that the fastener breaks or is detached from an anchoring.

In particular, the fastener can be designed to be released if the underfloor cladding is pressurized by the storage medium. There can thus advantageously be provision that the outflowing storage medium exerts a compressive force on the inner side of the underfloor cladding that releases the at least one fastener.

The at least one fastener can preferably be a latching connection which fastens the underfloor cladding to an underfloor structure. The underfloor structure can be for example a supporting structure and comprise for example a crossmember and/or a longitudinal member.

However, other triggering mechanisms which are directly or indirectly actuated by the storage medium are also conceivable. For example, the motor vehicle can have an unlocking mechanism for releasing the underfloor cladding, said mechanism, for the pressure relief, being able to be directly or indirectly actuated by the storage medium, for example at the start of and/or during the pressure relief. The unlocking mechanism can for example be displaceable in a direction which is not parallel to the flow path. The unlocking mechanism is preferably displaceable perpendicularly or substantially perpendicularly to the flow direction of the storage medium at the opening; and/or parallel or substantially parallel to adjacent regions of the outer skin.

The term "substantially" perpendicular or parallel means in this connection that small deviations, for example due to manufacturing tolerances, or the deviations which are irrelevant for the function are also included. Advantageously, such an unlocking mechanism allows the closure disclosed here and/or the underfloor cladding disclosed here to be held particularly securely during normal operation, that is to say before a pressure relief; and allows the flow path for the storage medium to be freed at the start of and/or during the pressure relief.

The technology disclosed here further relates to a method for the pressure relief of a pressure vessel of the motor vehicle disclosed here. The method comprises the step whereby, at the start of a pressure relief, the underfloor cladding is released at least in certain regions, preferably completely, from the underfloor structure of the motor vehicle in such a way that the outflow of the storage medium for pressure relief along the pressure relief path is directly or indirectly improved. The method disclosed here can in particular comprise the step whereby the at least one fastener, which fastens the underfloor cladding to the underfloor structure, is released at the start of and/or during the pressure relief.

The motor vehicle disclosed here can further comprise at least one closure. The closure is arranged in the flow path of the storage medium via which the storage medium flows out into the vehicle surroundings during the pressure relief. The motor vehicle is preferably designed, at the start of the pressure relief, to remove the closure at least partially from the flow path such that the flow resistance along the flow path for the storage medium during the pressure relief is less than it was before the pressure relief. The closure is as a rule designed, before a pressure relief, to cover the (body) outlet opening in the body outer skin (=outlet opening) more than during and/or at least directly after the pressure relief. In other words, the closure covers the outlet opening more during normal driving operation of the motor vehicle than during a pressure relief. The driving resistance of the motor vehicle can thus advantageously be improved. Driving noise can also advantageously be reduced. With further advantage, a protective action for components concealed behind the outlet opening can be exerted. If a pressure relief occurs, the pressure relief path is opened further than during normal driving operation. As a result, at least the flow resistance for the storage medium is reduced. With particular preference, the flow resistance which arises as a result of the opening cross section during the pressure relief is negligibly small for the pressure relief. Put yet another way, the closure can be designed to reduce a mass flow of storage medium before a pressure relief or during normal driving operation to a greater extent than during a pressure relief and/or at least immediately thereafter. The term "during the pressure relief" covers in particular the time span beginning at the time from which the pressure relief device is opened to the time where the pressure vessel inner pressure has been reduced to the maximum disturbance case pressure vessel inner pressure or to the ambient pressure.

The at least one closure can be designed, before the pressure relief, to substantially completely cover the outlet opening. Furthermore, the at least one closure can be designed to substantially free the outlet opening during and/or directly after the pressure relief. The term "substantially completely" here covers a completely closed closure and a closure which is opened only to such a slight degree that it is unimportant for the function (for example improving driving resistance, reducing noise emission, component protection, etc.). For this purpose, for example, depending on the configuration of the closure, the latter can still remain open to at most 1% or at most 5% or at most 20% of the maximum opening cross section.

According to the technology disclosed here, the closure can be designed to be substantially flush with the directly adjoining regions of the body outer skin. The term "substantially flush" means in this connection that the closure and the directly adjoining regions are arranged flush with respect to one another (that is to say merge into one another and without step) or that a small offset or a small step is provided which do not have an effect on the air resistance coefficient and/or on the driving noise or only to an insignificant extent. In other words, a flush closure is arranged in such a way that no or only few vortexes are expediently generated during driving operation as a result of this transition itself. In particular, the closure is thus designed not to appreciably project or to be set back with respect to the adjacent regions of the underfloor cladding.

In particular, the closure and the opening can be designed and arranged in such a way that:

the opening or mouth of the at least one pressure relief line is spaced by at most 10 cm or at most 5 cm or at most 1 cm from the closure; and/or during the pressure relief, preferably at least 80% or at least 90% or at least 95% or at least 99% of the storage medium exiting the at least one pressure vessel flows into the surroundings outside of the motor vehicle through the outlet opening which was covered by the closure before the pressure relief, and which is freed during the pressure relief.

In particular, the storage medium can be led up to the closure in such a way and the closure can be designed in such a way that, at the start of the pressure relief, the storage medium transfers the closure from a first state to a second state, wherein the closure closes the outlet opening more in the first state than in the second state.

The at least one outlet opening is preferably dimensioned such that, in the case of a pressure relief, the storage medium can flow out through the at least one outlet opening without the outlet opening itself, in the open state of the outlet opening, constituting a flow resistance which is relevant for the pressure relief.

With particular preference, the closure can be or is fitted to the body outer skin. The closure is preferably designed to substantially completely close the outlet opening before the pressure relief and to substantially free the outlet opening during and/or directly after the pressure relief.

In one embodiment, the closure can be a cover which can be or is fitted to the body outer skin. The cover can here have any suitable shape and structure. The cover can for example be configured in such a way that the cover can be pressed out of the body outer skin during a pressure relief by the compressive force of the storage medium and/or the projectile disclosed here.

Alternatively, the at least one closure can be a flap which is fitted to the body outer skin. The flap can have a restoring device which, before the pressure relief, holds the flap in a position in which it substantially completely closes the outlet opening. Such a restoring device can be for example a torsion spring which presses the flap onto the body outer skin, in particular onto an underfloor cladding. In particular, the flap can be designed to be able to be transferred into an open position by the outflowing storage medium at least during the pressure relief, with the result that, at least during the pressure relief, the outlet opening is substantially freed for the pressure relief.

Alternatively, such a restoring device can be for example a torsion spring which, after a release of a latching element by the pressure relief, holds the flap in an open position. This has the advantage that a force must be exerted on the latching element by the outflowing storage medium only at the start of the pressure relief if the vessel pressure is as a rule still very large. After this once-only overcoming of the latching element, the restoring device serves to hold open the flap such that a free outflow of the storage medium is reliably possible even with decreasing inner pressure.

Alternatively or additionally, the at least one closure can be formed by a rupture disk. Rupture disks as such are known. They are designed to break at a predetermined rupture pressure. The rupture pressure of the rupture disk is expediently low enough that the rupture disk, on the one hand, is not damaged by stone projection (for example from the roadway) and, on the other hand, is rapidly and securely destroyed during a pressure relief by the outflowing storage medium.

Alternatively or additionally, the closure can be formed by the body outer skin itself. For example, the closure can be formed by a predetermined breaking point of the body outer skin. Such a predetermined breaking point can be formed for example by material cutouts in the body outer skin. For example, a perforation can be provided in the body outer skin. The predetermined breaking point is designed to close the outlet opening formed in the body outer skin during the driving operation of the motor vehicle or before a pressure relief. The predetermined breaking point is further designed to break out of the body outer skin during a pressure relief. The predetermined breaking point thus simultaneously forms the outlet opening during a pressure relief. The body outer skin can expediently be produced from a metal material, for example in a forming method. The predetermined breaking point can be advantageously incorporated in the body outer skin by stamping. However, this does not have to be the case. If use is made for example of a plastics material (for example a composite material), the material cutouts can be already incorporated during the production (for example in the mold).

The closure can preferably be able to be latched onto the body outer skin, preferably onto the underfloor cladding, by at least one latching connection. For this purpose, at least one latching nose can be provided on the closure, said latching nose, in the mounted state, generally engaging behind an undercut of the body outer skin or of the body. If a pressure relief now occurs, the closure is pressurized by the outflowing storage medium in such a way that the latching connection is released, in particular by virtue of the latching noses bending or breaking. The latching connection is expediently designed to hold the closure in the substantially closing position during driving operation or before the pressure relief.

The opening cross-sectional area of the outlet opening is preferably large enough that servicing operations and/or assembly operations are possible through it. For this purpose, the outlet opening can have for example a diameter or edge spacing of opposite edges of at least 5 cm or at least 10 cm or at least 20 cm.

As already explained, in one embodiment the underfloor cladding itself can form the cover. In other words, the underfloor cladding can be designed, before the pressure relief, to close the outlet opening provided in the body outer skin more than during and/or after the pressure relief. For example, for this purpose, the underfloor cladding can be fitted to the body outer skin by corresponding latching means. It is also conceivable to provide other fastener which are securely released at the start of the pressure relief and otherwise securely hold the underfloor cladding. Such an underfloor cladding then preferably has no further closure which is inserted into the underfloor cladding, or only such closures which do not or do not substantially adversely affect the movement to free the flow path through the underfloor cladding; that is to say, for example, swing hinges which allow the underfloor cladding to swing away, or other securing elements which prevent the underfloor cladding moved out of the flow path from flying away.

According to the technology disclosed here, the closure is designed to close the opening of the fluid connection or pressure relief line between the pressure relief device and outlet opening in a dust-tight manner and/or in a storage-medium-tight manner such that no dirt enters the pressure relief line. In particular, the closure can thus also be designed to terminate flush with the body outer skin and at the same time to close the set-back opening of the at least one pressure relief line.

With particular preference, the closure disclosed here is produced from an elastic plastic. The closure can expediently be designed to fasten the closure to an end of the pressure relief line by elastic deformation of the closure, with an outer surface of the closure preferably being arranged flush on adjacent regions of the body outer skin. It is thus possible at the same time, and in a cost-effective manner, to realize effective dust protection, a simple pressure relief mechanism and good aerodynamics.

In a particularly preferred embodiment, the motor vehicle comprises at least one projectile. The projectile can be designed to close the at least one opening. Furthermore, the projectile can be designed, for pressure relief of the pressure vessel, to penetrate through the closure and/or the underfloor cladding so as to free or form the outlet opening A. The projectile here can have any suitable shape. For example, a cap can form the projectile. For example, an end of the at least one pressure relief line can form the opening. In one embodiment, a cap can form the projectile, and the cap can cover the end of the pressure relief line or can be fitted onto the end. Alternatively or additionally, the projectile can be a plug which is inserted into and closes the opening O at the end of the pressure relief line. If pressure relief now occurs, the projectile is accelerated by the compressive force acting on the projectile to such an extent that it penetrates through the closure and thus frees the outlet opening A in the body outer skin or underfloor cladding. Such an embodiment can be realized in a particularly simple and failsafe manner and is associated with comparatively low costs. In particular, the projectile can advantageously be combined with a rupture disk.

In other words, the technology disclosed here relates to a motor vehicle having at least one pressure vessel and an underfloor cladding. In order to avoid a permanent opening in the underfloor cladding or in the body and at the same time to avoid the outflow into a closed space of the motor vehicle during a pressure relief (in particular by virtue of the pressure relief device), according to the technology disclosed here the outlet openings can be opened during a pressure relief.

The outlet openings can be outlet openings in the underfloor cladding which are closed by covers and/or flaps and/or rupture disks, wherein the covers and/or flaps and/or rupture disks are brought from the closed state into an open state by the outflowing storage medium or the gas flows due to the outflow of the storage medium. This opening can occur reversibly (in the case of spring-loaded flaps) or irreversibly (in the case of covers which fly away as a result of the pressure relief and/or in the case of rupture disks which are destroyed as a result of the pressure relief).

The closed state is characterized in that the function of the underfloor cladding (protection, reduction of the air resistance) is substantially fulfilled. However, the outflow in the case of a pressure relief would be adversely affected in the closed state. The open state is characterized in that the function of the underfloor cladding is adversely affected. However, this is unimportant since this state is ideally assumed only during (or after) a pressure relief. The outflow of the storage medium is not or only slightly adversely affected in the open state.

In a preferred embodiment, one or more connections between the body and underfloor cladding are released in the case of a pressure relief, with the result that one or more outlet openings are formed between the body and underfloor cladding. During a pressure relief, the underfloor cladding can also be released completely from the body, or be secured only against flying away, for example by means of a cable.

In the simplest case, the connections (or a part of the connections) can comprise latchable elements (clips, plug-in bolts etc.). These can be configured in such a way that, during normal driving operation, even on poor road surfaces, the acceleration forces which act on the connections do not cause the connections to be released, that is to say the connections remain in the latched-in position. It is only in the case of a pressure relief (in particular upon triggering of the TPRDs) that the outflowing storage medium, or the gas flows due to the outflow of the storage medium, can produce forces on the latchable elements that cause the connection or connections to be released.

Should this "simplest case" not be able to be directly realized, for example because the forces during normal driving operation exceed the forces during a pressure relief, still further implementation possibilities then present themselves:

On the one hand, it is possible to exploit the fact that, in the case of a pressure relief, high pressures and thus, with respect to an area, high forces occur at least directly in the vicinity of the outflow opening which is freed by the pressure relief device. These locally high forces during a pressure relief in any case significantly exceed the forces occurring at the same point during normal operation of the vehicle and can be used to activate an unlocking mechanism.

On the other hand, a cover could be connected to a closure cap of the outflow pipe in such a way that, during a pressure relief, the closure cap/cover arrangement is removed from the underfloor cladding, and a free opening occurs in the underfloor cladding, as a result of the outflowing storage medium or the fluid flows due to the outflow of the storage medium.

According to the technology disclosed here, the underfloor cladding remains intact and, in normal operation, can fulfill its protective function and achieve the reduction in the air resistance. At the same time, in the case of a pressure relief, an opening is ensured that allows the free outflow of the storage medium.

The disclosed technology will now be described in more detail with reference to the following figures.

DETAILED DESCRIPTION OF THE DRAWINGS

Figure 1:
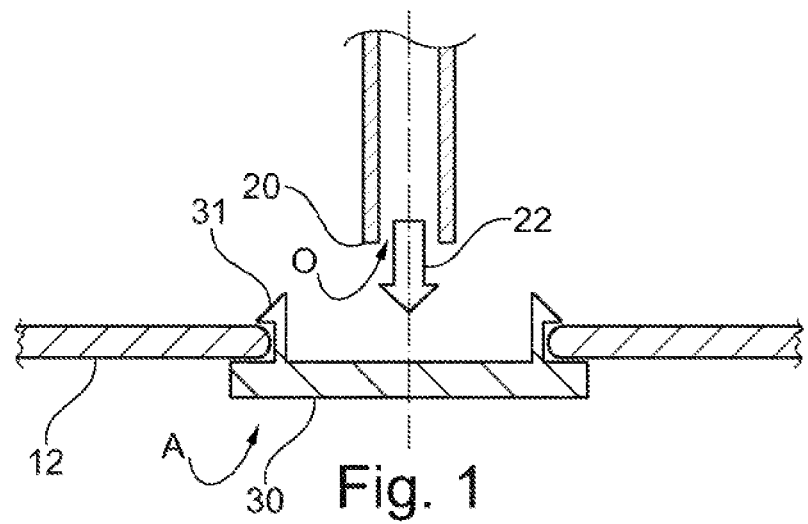
FIG. 1 shows a schematic cross-sectional view of a first embodiment of the technology disclosed here.

FIG. 1 shows a schematic cross-sectional view of a first embodiment of the technology disclosed here. The closure 30 is here formed as a cover. The cover 30 here closes the outlet opening A. The outlet opening A is here provided on the underfloor cladding 12. The body outer skin 10 to which the underfloor cladding 12 is fastened has been omitted here for simplification. The pressure relief device of the motor vehicle has also been omitted. The pressure relief line 20 is fluidically connected to the pressure relief device. This pressure relief line 20 can also be referred to as a pressure relief line. If pressure relief of the pressure vessel occurs, the storage medium, as a rule fuel, flows through the pressure relief line 20. The pressure relief line 20 opens here directly adjacent to the cover 30 in the opening O. The outflowing storage medium exerts a compressive force on the cover. This compressive force has the effect that the latching connections 31, here formed as latching hooks, yield and the cover 30 is pressed out of the underfloor cladding 12. During the pressure relief, the closure 30 thus completely frees the outlet opening A here. The storage medium can thus flow substantially unimpeded out of the pressure relief line 20 into the surroundings of the motor vehicle and does not emerge in a substantially closed space of the motor vehicle. In the assumed disturbance case that the closure 30 is not pressed out by the storage medium, the storage medium, by virtue of the opening O arranged set back with respect to the body outer skin 10, storage medium could here nevertheless flow out through the gap between the closure 30 and the opening O into the vehicle body (for example underfloor structure) and escape through further outlets. For example, the underfloor cladding could be completely or partially torn from its anchoring.

Figure 2:
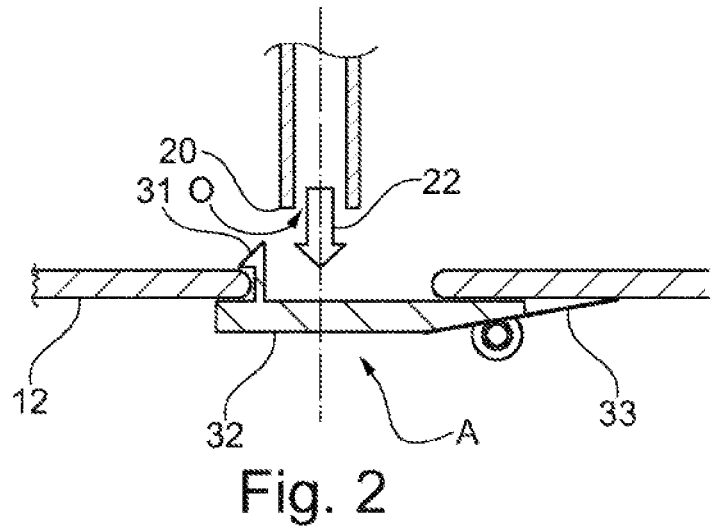
FIG. 2 shows a schematic cross-sectional view of a second embodiment of the technology disclosed here.

FIG. 2 shows a further embodiment of the technology disclosed here. Only the differences over the embodiment shown in FIG. 1 will be explained below. In FIG. 2, the closure is formed as a flap 32. The flap two 30 is connected at one end to the underfloor cladding 12. Here, a spring means 33 is provided at this end. At the other end of the flap 32, the latching nose 31 is provided here. The latching nose 31 builds up a counterforce to the spring force 33. During normal driving operation (that is to say before a pressure relief), the latching nose 31 holds the flap 32 in the closed state. If the pressure relief now occurs, the outflowing storage medium produces a compressive force on the inner side of the flap 32. This compressive force causes unlatching of the latching hook 31. The spring 33 then transfers the flap from the closing position, in which it is substantially flush with the outer surface of the underfloor cladding 12, into an open position. In this open position, the flap 32 does not close the outlet opening A. The storage medium can thus escape substantially without pressure loss from the mouth of the pressure relief line 20 into the external surroundings of the motor vehicle.

Figure 3:
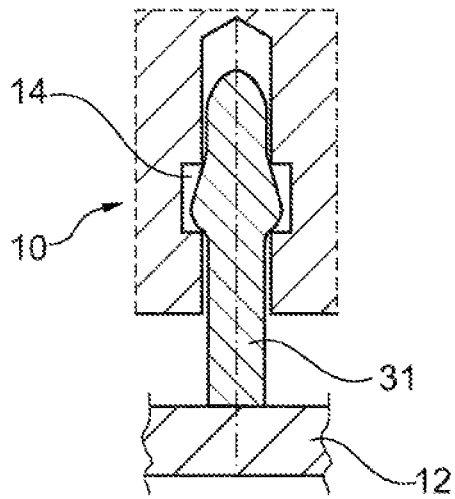
FIG. 3 shows a schematic cross-sectional view of a latching connection.

FIG. 3 shows an embodiment of a latching connection 31. The latching connection here comprises a latching hook or latching bolt which engages in an undercut 14 of the body structure 10. This latching connection 31 can for example fasten the underfloor cladding 12 to the body structure 10. It is also conceivable that the cover 30 or the flap 32 is mounted by means of such a latching connection 31.

Figure 4:
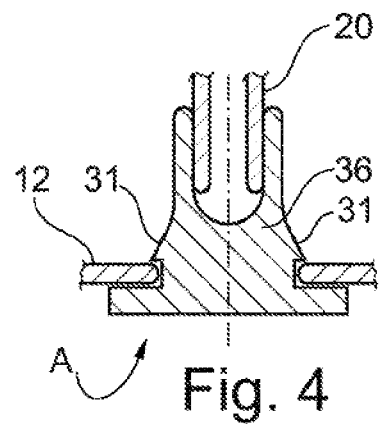
FIG. 4 shows a schematic cross-sectional view of a further embodiment of the technology disclosed here of a closure cap/cover arrangement.

FIG. 4 shows a further embodiment of the technology disclosed here. Only the differences over the embodiment shown in FIG. 2 will be explained below. FIG. 4 shows a cover 36 in which a closure cap is integrated here. The closure cap is designed to close the mouth of the pressure relief line 20. Furthermore, the closure cap is designed to shield the space between the mouth of the pressure relief line and the outlet opening A with respect to adjacent spaces. This has the advantage that no dirt which could possibly prevent the opening of the outlet opening A during the pressure relief can accumulate between the mouth of the pressure relief line 20 and the outlet opening A. However, such a closure cap/cover arrangement 36 does not have to be provided.

Figure 5:
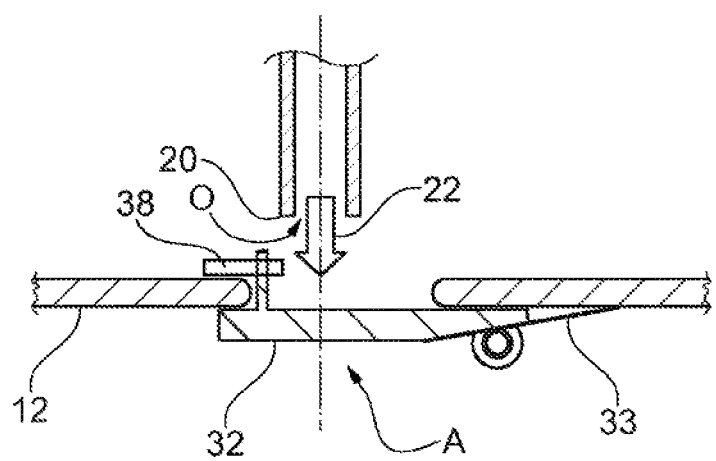
FIG. 5 shows a schematic cross-sectional view of an embodiment with an unlocking mechanism.

FIG. 5 shows a further embodiment of the technology disclosed here. Only the differences over the embodiment shown in FIG. 2 will be explained in more detail below. Instead of a latching hook 31, the embodiment illustrated here has an unlocking mechanism 38. The unlocking mechanism 38 can be a slide 38, for example. According to the technology disclosed here, the unlocking mechanism 38 is particularly preferably actuated by the outflowing storage medium (not shown). The precise activation of the slide 38 is familiar to a person skilled in the art of pneumatics. During normal driving operation, that is to say before a pressure relief, the unlocking mechanism 38 here locks the flap 32. The flap 32 is thus held securely in its position. At the start of the pressure relief, the storage medium here produces a translational movement perpendicular to the outflow direction 22 of the storage medium. The slide 38 is here drawn back to the left from a cutout. The counterforce to the spring force of the torsion spring 33 is thus absent. The flap 32 is thus opened.

The teaching illustrated in the figures can also be combined. For example, the closure flap shown in FIG. 4 can also be applied to a flap 32. Likewise, the latching connection 31 of FIG. 3 can also be provided in the other embodiment. Furthermore, the unlocking mechanism of FIG. 5 can also be applied for example to all other embodiments.

For reasons of legibility, the expression "at least one" has been partially omitted for simplification. Where a feature of the technology disclosed here has been described in the singular or indefinitely (for example the/a pressure vessel, the/a pressure relief device, the/a closure, the/a cover, the/a flap, the/a opening, the/a restoring means, the/a rupture disk, the/a predetermined breaking point, the/a material saving, the/a latching connection, the/a pressure relief line, etc.), the plural thereof is also intended to be disclosed at the same time (for example the at least one pressure vessel, the at least one pressure relief device, the at least one closure, the at least one cover, the at least one flap, the at least one opening, the at least one restoring means, the at least one rupture disk, the at least one predetermined breaking point, the at least one material saving, the at least one latching connection, the at least one pressure relief line, etc.).

The foregoing description of the present invention serves only for illustrative purposes and not for the purpose of limiting the invention. Various changes and modifications are possible within the context of the invention without departing from the scope of the invention and equivalents thereof.

LIST OF REFERENCE SIGNS 10 body structure or underfloor structure
12 underfloor cladding
20 pressure relief line
22 outflow direction
30 cover
1 latching hook
32 flap
33 torsion spring (restoring device)
36 closure cap/cover arrangement
38 unlocking mechanism
O opening
A outlet opening

What is claimed is:

1. A motor vehicle, comprising:
at least one pressure vessel for storing storage medium;
at least one pressure relief device for pressure relief of the at least one pressure vessel; and
at least one opening that is fluidically connected to the pressure relief device and defines a flow path of the pressure relief, wherein the at least one opening is set back from a body outer skin that obstructs the flow path.

2. The motor vehicle according to claim 1, further comprising:
at least one closure which is formed substantially flush with directly adjoining regions of the body outer skin, wherein
the closure is arranged in the flow path via which the storage medium flows out into the vehicle surroundings during the pressure relief, and
the motor vehicle is designed, at the start of the pressure relief, to remove the closure at least partially from the flow path.

3. The motor vehicle according to claim 2, further comprising:
at least one projectile, wherein
the projectile is designed to close the at least one opening, and
the projectile is designed, for pressure relief, to penetrate through the closure and/or the body outer skin.

4. The motor vehicle according to claim 2, wherein the at least one closure is a cover which is fittable to the body outer skin.

5. The motor vehicle according to claim 4, wherein the at least one closure is a flap which is fitted to the body outer skin in a hinged manner.

6. The motor vehicle according to claim 5, wherein the flap has a restoring device which, before the pressure relief, holds the flap in a position which substantially completely closes an outlet opening of the body outer skin.

7. The motor vehicle according to claim 5, wherein the flap is transferrable into an open position by outflowing storage medium at least during a pressure relief.

8. The motor vehicle according to claim 2, wherein the closure is formed by a rupture disk.

9. The motor vehicle according to claim 2, wherein the closure is formed by the body outer skin.

10. The motor vehicle according to claim 9, wherein the closure is formed by a predetermined breaking point of the body outer skin.

11. The motor vehicle according to claim 10, wherein at least one of:
the predetermined breaking point is formed by material cutouts in the body outer skin; and
the predetermined breaking point is formed by a perforation.

12. The motor vehicle according to claim 2, wherein the closure closes the opening in a dust-tight manner such that no dirt enters a pressure relief line of the pressure relief device.

* * * * *